(12) United States Patent
Maehara

(10) Patent No.: US 6,321,889 B1
(45) Date of Patent: Nov. 27, 2001

(54) SHOE DRIVING MECHANISM FOR DRUM BRAKE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/653,262

(22) Filed: Aug. 31, 2000

(30) Foreign Application Priority Data

Sep. 1, 1999 (JP) .................................................. 11-247568

(51) Int. Cl.[7] .................................................. F16D 51/00
(52) U.S. Cl. .................................................. 188/325; 188/362
(58) Field of Search .................................................. 188/78, 325, 327, 188/330, 334, 362

(56) References Cited

U.S. PATENT DOCUMENTS 6,059,077 * 5/2000 Maehara .................................................. 188/325
6,186,294 * 2/2001 Maehara .................................................. 188/325

FOREIGN PATENT DOCUMENTS 11-22756 * 1/1999 (JP) .
11-30249 * 2/1999 (JP) .

* cited by examiner

Primary Examiner—Robert J. Oberleitner
Assistant Examiner—Thomas J. Williams
(74) Attorney, Agent, or Firm—Morgan, Lewis & Bockius LLP

(57) ABSTRACT

A shoe driving mechanism for a drum brake for pressing brake shoes against a drum is formed as an assembly in which the following are assembled to base plates which are rotatably fitted to an anchor pin for a primary shoe: an anchor pin for the secondary shoe; first and second lever supporting pins; a balance lever which is swingably supported by the first and second lever supporting pins whose distal-end side outer periphery is brought into contact with one end of the primary shoe; and an input lever for transmitting to the balance lever and the secondary shoe a shoe operating force inputted from an operating-force generating mechanism.

7 Claims, 6 Drawing Sheets

SHOE DRIVING MECHANISM FOR DRUM BRAKE

BACKGROUND OF THE INVENTION

1. Field of the Invention

The present invention relates to a shoe driving mechanism for a drum brake which, by controlling the pressing force of brake shoes against a drum, is able to ensure high braking performance and stability, is suitable for the adoption of an electrically powered system for an operating-force generating mechanism, and makes it possible to improve assembling efficiency.

2. Description of the Related Art

Conventionally, drum brakes of various types are used for braking running of vehicles. These drum brakes are classified into a leading trailing type, a two leading shoe type, a duo-servo type, and the like depending on the arrangement of the brake shoes which are pressed against an inner peripheral surface of a substantially hollow cylindrical drum.

Generally, the drum brake of the duo-servo type has a pair of brake shoes, including a primary shoe and a secondary shoe, which are disposed in face-to-face relation within a hollow cylindrical drum.

The primary shoe is arranged such that its inlet side in a forwardly rotating direction of the drum serves as an input portion, and its outlet side in the forwardly rotating direction of the drum is lined to an inlet side of the secondary shoe through, for example, an adjuster. Meanwhile, an outlet side of the secondary shoe abuts against an anchor portion mounted on a backing plate, and an anchor reacting force acting in the primary shoe and the secondary shoe is received by the anchor portion.

Consequently, if the primary shoe and the secondary shoe are extended and are pressed against the inner peripheral surface of the drum, the anchor reaction force acting in the primary shoe is inputted to the inlet side of the secondary shoe so as to act in such a way as to press the secondary shoe against the inner peripheral surface of the drum. Hence, both the primary shoe and the secondary shoe operate as leading shoes, so that it is possible to obtain a braking force with an extremely high gain.

As compared to the drum brakes of the leading trailing type and the two leading shoe type, the drum brake of the duo-servo type has numerous advantages in that not only is the apparatus able to obtain an extremely high braking force, but it can be easily downsized, and that it is possible to easily incorporate a parking brake.

However, since the above-described drum brake of the duo-servo type is sensitive to a change in the coefficient of friction of a brake shoe lining, the apparatus has a tendency that the braking force is difficult to stabilize. Hence, there has been a demand for providing a measure for stabilizing the braking force.

In view of the foregoing background, the applicant of this invention has already proposed a shoe driving mechanism in which a fluid-pressure controlling valve is incorporated in a wheel cylinder of a fluid pressure type for extending the pair of brake shoes, and the supply of fluid pressure to the wheel cylinder is controlled in correspondence with the anchor reaction force, thereby stabilizing the braking force.

However, with the braking apparatuses for vehicles in recent years, attempts to make brake functions intelligent are being actively undertaken, such as the provision of an antilock brake system and the provision of a traction control system. In addition, development of electric vehicles (EV) and hybrid vehicles is also being actively undertaken in view of the alleviation of environmental pollution and the like. To cope with the tendencies toward intelligent brake functions, electric vehicles, and the like, it has been an important issue to adopt an electrically powered system for the brake apparatus.

In adopting the electrically powered system for the brake apparatus, instead of the conventional wheel cylinder of the fluid pressure type, an operating-force generating mechanism of an electrically powered type making use of an electric motor or the like is adopted, for example. In that case, it becomes impossible to make use of the aforementioned shoe driving mechanism for controlling the supply of fluid pressure to the wheel cylinder of the fluid pressure type to a value corresponding to the anchor reaction force by means of a fluid-pressure controlling valve, and the development of a shoe driving mechanism adapted to the operating-force generating mechanism of the electrically powered type is newly required, which has been a new task in the adoption of the electrically powered system for the duo-servo type drum brake.

For this reason, as a shoe driving mechanism adapted to the operating-force generating mechanism of the electrically powered type, link mechanism have been proposed for transmitting the output of the operating-force generating mechanism to the pair of brake shoes. However, the shoe driving mechanisms based on the conventional link mechanisms have numerous component parts, and since the component parts must be assembled between the pair of brake shoes one by one, so that there has been a problem in that the operating efficiency in assembly is poor.

The present invention has been devised in view of the above-described circumstances, and its object is to provide a shoe driving mechanism for a drum brake which, by controlling the pressing force of brake shoes against a drum, is able to ensure high braking performance and satiability, which makes it possible to use any one of an actuator of an electrically powered or fluid-pressure type and a manual-type link mechanism and is therefore versatile, which has a relatively fewer number of component parts, and which makes it possible to improve the operating efficiency in assembly by assembling in advance the component parts as a unit and by subsequently assembling the unit between the pair of brake shoes.

To attain the above object, in accordance with the present invention, there is provided a shoe driving mechanism for a drum brake in which a shoe operating force generated by operating-force generating mechanism is transmitted to a primary shoe and a secondary shoe arranged in face-to-face relation in an inner space of a drum to press the brake shoes against the drum, and a pressing force of the brake shoes against the drum is controlled in correspondence with an anchor reaction force applied to an anchor pin, characterized by comprising: a base plate which is rotatably fitted to the anchor pin for the primary shoe; an anchor pin for the secondary shoe disposed uprightly at a position spaced apart a predetermined distance in the circumferential direction of the drum from an inserting position of the anchor pin for the primary shoe on the base plate; a first lever supporting pin disposed uprightly at a position spaced apart on a radially inward side of the drum from the inserting position of the anchor pin for the primary shoe on the base plate; a second lever supporting pin disposed uprightly at an intermediate position between the first lever supporting pin and the inserting position of the anchor pin for the primary shoe on the base plate; a balance lever whose proximal end is rotatably fitted to and supported by the first lever supporting pin, and in a distal end side of which is penetratingly formed a swinging-motion restricting hole through which the second lever supporting pin is passed and which restricts a range of its swinging motion about the first lever supporting pin, an outer periphery of the distal end side abutting against one end of the primary shoe; and an input lever which is brought into contact with the balance lever and the secondary shoe and is adapted to transmit the shoe operating force inputted from the operating-force generating mechanism to the balance lever and the secondary shoe, wherein the pressing force applied to the brake shoes is restricted by the behavior of the base plate and the respective levers corresponding to the anchor reaction force applied through the anchor pin for the secondary shoe and the input lever during braking.

The shoe driving mechanism for a drum brake according to the present invention is characterized in that after the anchor pin for the secondary shoe, the first lever supporting pin, the second lever supporting pin, the balance lever, and the input lever are assembled to the base plate as an assembly, the base plate is fitted to the anchor pin for the primary shoe so as to assemble the shoe driving mechanism to a backing plate of the drum brake.

Then, in accordance with the above-described arrangement, when the shoe operating force is inputted from the operating-force generating mechanism to the input lever of the shoe driving mechanism, the input lever swings so as to press the intermediate portion of the balance lever by the input transmitting portion, and press the secondary shoe toward the inner peripheral surface of the drum by a shoe abutting portion. The pressing force applied from the input lever to the balance lever due to the swinging behavior of the input lever causes the balance lever to swing toward the primary shoe side with the first lever supporting pin as the fulcrum of rotation, thereby pressing the primary shoe toward the inner peripheral surface of the drum. Then, the swinging motion of the balance lever toward the primary shoe side with the first lever supporting pin as the fulcrum of rotation terminates as the second lever supporting pin is brought into contact with one end of the swinging-motion restricting hole. Subsequently, the balance lever and the base plate swing as a unit about the anchor pin for the primary shoe, thereby pressing the primary shoe against the inner peripheral surface of the drum.

The pressing force applied from the input lever to the secondary shoe due to the swinging behavior of the input lever displaces the secondary shoe toward the inner peripheral surface side of the drum, thereby pressing the secondary shoe against the inner peripheral surface of the drum.

As described above, a braking force is generated as the shoe operating force is inputted from the operating-force generating mechanism to the input lever of the shoe driving mechanism, and the swinging motion of the input lever presses the respective brake shoes against the inner peripheral surface of the drum.

In a state inwhich the braking force is being generated, the anchor reaction force of the secondary shoe is applied to the anchor pin for the secondary shoe disposed uprightly on the base plate, and the anchor reaction force applied to the anchor pin for the secondary shoe causes torque to be applied to the base plate in a direction opposite to that of torque applied to the base plate by the shoe operating force.

Therefore, when the anchor reaction force reaches a predetermined magnification with respect to the shoe operating force, the torque applied to the base plate by the shoe operating force assumes a state of equilibrium with the torque applied to the base plate by the anchor reaction force. Then, when the anchor reaction force exceeds the predetermined magnification with respect to the shoe operating force, the torque applied to the base plate by the anchor reaction force overcomes the torque applied to the base plate by the shoe operating force. Consequently, the base plate swings toward the secondary shoe side with the anchor pin for the primary shoe as the fulcrum of rotation. This swinging motion of the base plate toward the secondary shoe side pushes back the input lever through the balance lever being retained by the first and second lever supporting pins, and applies to the input lever a braking limiting force in a direction of decreasing the action of the shoe operating force.

BRIEF DESCRIPTION OF THE DRAWINGS

FIGS. 4(a) to 4(c) are external views of the shoe driving mechanism in an assembled state, in which FIG. 4(a) is a front elevational view, FIG. 4(b) is a side elevational view, and FIG. 4(c) is a rear view;

DETAILED OF THE PREFERRED EMBODIMENTS

Figure 1:
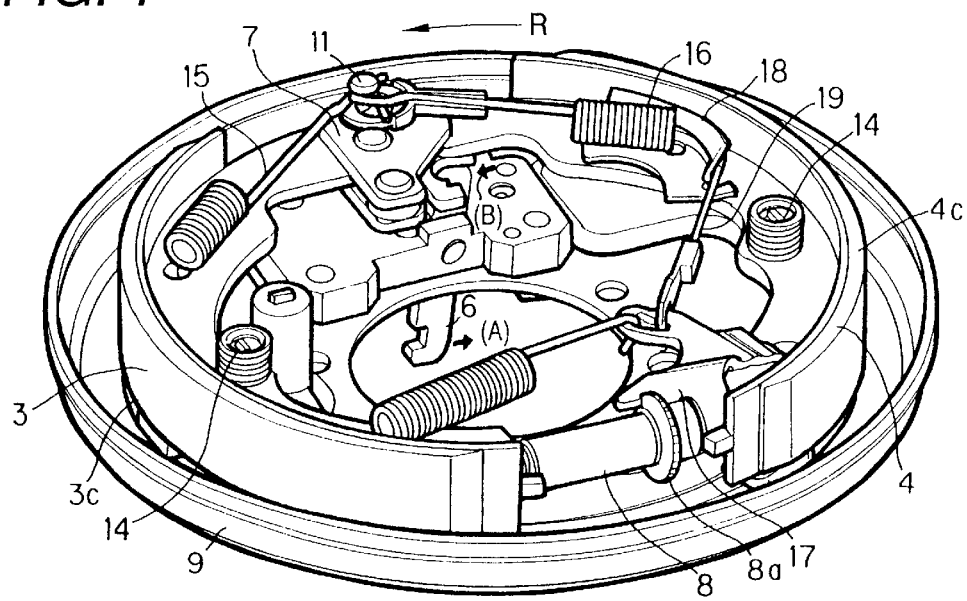
FIG. 1 is a perspective view of a first embodiment of a drum brake using a shoe driving mechanism in accordance with the present invention.

Referring now to the drawings, a description will be given of the preferred embodiments of a shoe driving mechanism for a drum brake in accordance with the present invention.

Figure 2:
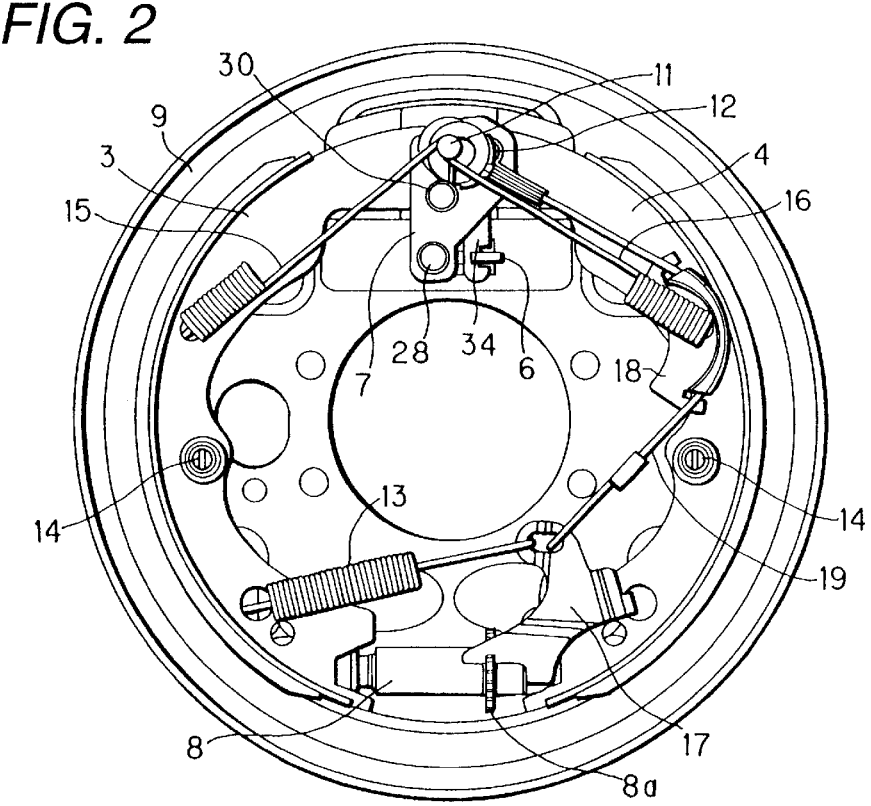
FIG. 2 is a front elevational view of the drum brake shown in FIG. 1.
Figure 3:
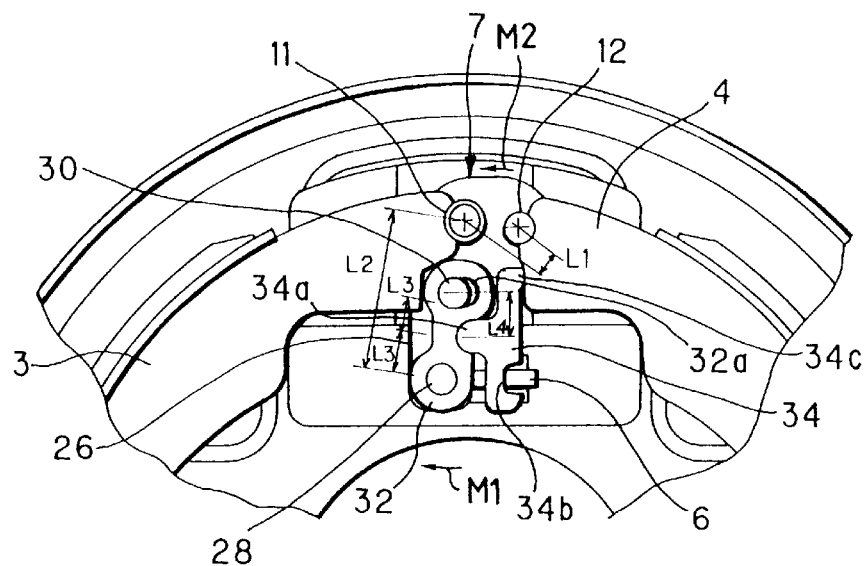
FIG. 3 is an enlarged view, with an upper base plate removed, of the shoe driving mechanism shown in FIG. 2.
Figure 4:
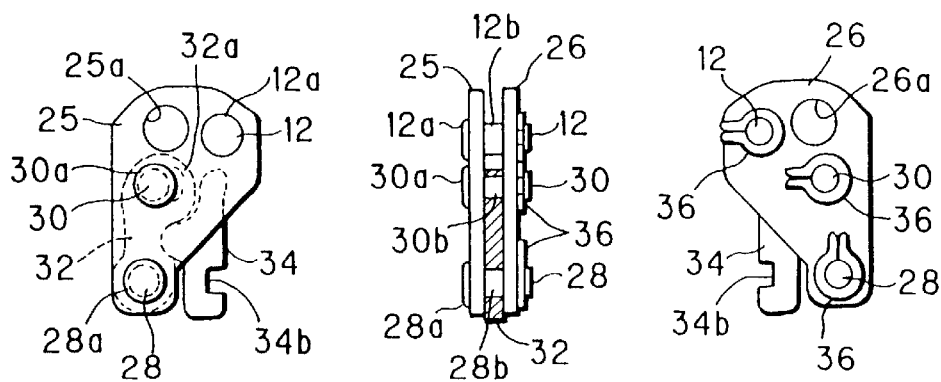

FIGS. 1 to 4 illustrate a first embodiment of the shoe driving mechanism for a drum brake in accordance with the present invention, in which FIG. 1 is a perspective view of the drum brake using the shoe driving mechanism in accordance with the present invention, FIG. 2 is a front elevational view of the drum brake, FIG. 3 is an enlarged view, with an upper base plate removed, of the shoe driving mechanism, and FIGS. 4(a) to 4(c) are external views of the shoe driving mechanism in an assembled state, in which FIG. 4(a) is a front elevational view, FIG. 4(b) is a side elevational view, and FIG. 4(c) is a rear view.

The drum brake in this embodiment is a drum brake of the so-called duo-servo type and is comprised of: a pair of brake shoes 3 and 4, including a primary shoe 3 and a secondary shoe 4, which are disposed in face-to-face-relation in an inner space of an unillustrated drum of a substantially hollow cylindrical shape; an operating-force generating mechanism 6 disposed on a side of one opposing ends of the brake shoes 3 and 4 and adapted to generate a shoe operating force for pressing the brake shoes 3 and 4 against the drum; a shoe driving mechanism 7 for transmitting the operating force generated by the operating-force generating mechanism 6 to the respective brake shoes 3 and 4; an adjuster 8 disposed between the other opposing ends of the brake shoes 3 and 4 and also serving as a link mechanism for inputting the output of the primary shoe 3 to the secondary shoe 4; a backing plate 9 for supporting these component members; and anchor pins 11 and 12 disposed uprightly on the backing plate 9 to receive an anchor reaction force from the brake shoes 3 and 4.

It should be noted that the unillustrated drum is concentric with the backing plate 9, and rotates in the direction of arrow R in FIG. 1 during the forward running of the vehicle.

The brake shoes 3 and 4 are attached to the backing plate 9 by shoe supporting shafts 14 in such a manner as to be movable toward the inner periphery of the drum.

End portions of the brake shoes 3 and 4 on the operating-force generating mechanism 6 side are linked to the anchor pin 11 through shoe springs 15 and 16, so that the end portions of the respective shoes are urged in mutually approaching directions (i.e., in directions of moving away from the drum).

In addition, the brake shoes 3 and 4 are urged by the urging force of an adjuster spring 13 such that the state of abutment of their respective end portions on the adjuster 8 side against the end portions of the adjuster 8 is maintained.

In the case of this embodiment, the operating-force generating mechanism 6 is a swinging lever in which when its proximal end is pulled in the direction of arrow (A) in FIG. 1 in correspondence with a braking operation, its distal end side is displaced in the direction of arrow (B) due to the resultant swinging motion.

The adjuster 8 essentially adjusts the space between the end portions of the brake shoes 3 and 4 in correspondence with the advance of wear of linings 3c and 4c of the respective brake shoes 3 and 4, and is constructed such that the space between the end portions of the brake shoes 3 and 4 is automatically adjusted by the rotating movement of an adjuster lever 17 whose distal end is brought into contact with an adjusting gear 8a on the adjuster 8 by the urging force of the adjuster spring 13.

An end portion of an adjuster cable 19 from the anchor pin 11 for the primary shoe, which will be described later, and passing through a cable guide 18 attached to the secondary shoe 4 is linked to the adjuster lever 17. This adjuster cable 19 causes a rotating force to be applied to the adjuster lever 17 in correspondence with the amount of movement of the secondary shoe 4 at the time when it is extended, thereby causing the adjuster lever 17 to effect predetermined rotating movement.

As illustrated in the drawings, the pair of anchor pins 11 and 12 are arranged at positions close to a radial outer periphery of the drum in such a manner as to be spaced apart from each other in the circumferential direction. One anchor pin 11 is for the primary shoe, while the other anchor pin 12 is for the secondary shoe.

As shown in FIG. 4, the shoe driving mechanism 7 in this first embodiment is comprised of a pair of upper and lower base plates 25 and 26 which are rotatably fitted to the anchor pin 11 for the primary shoe; the anchor pin 12 for the secondary shoe disposed uprightly at a position spaced apart an appropriate distance in the circumferential direction of the drum from an inserting position of the anchor pin 11 for the primary shoe on the base plates 25 and 26; a first lever supporting pin 28 disposed uprightly on the radially inward side of the drum from the inserting position of the anchor pin 11 for the primary shoe on the base plates 25 and 26; a second lever supporting pin 30 disposed uprightly at an intermediate position between the first lever supporting pin 28 on the base plates 25 and 26 and the inserting position of the anchor pin 11 for the primary shoe; and a balance lever 32 and an input lever 34 which are incorporated between the pair of base plates 25 and 26.

The pair of base plates 25 and 26 are linked together by the anchor pin 12 and the first and second lever supporting pins 28 and 30 in a state of being opposed to each other with the balance lever 32 and the input lever 34 placed therebetween. Fitting holes 25a and 26a for rotatably fitting to the anchor pin 11 for the primary shoe are penetratingly formed in the respective base plates 25 and 26.

Each of the anchor pin 12 for the secondary shoe and the first and second lever supporting pins 28 and 30 includes enlarged-diameter heads 12a, 28a, and 30a for abutting against the upper base plate 25 as well as shanks 12b, 28b, and 30b which are passed through the upper and lower base plates 25 and 26. Respectively fitted to the shanks 12b, 28b, and 30b are stop rings 36 for preventing the shanks from coming off the lower base plate 26 to set these pins in assembled states.

As for the balance lever 32, its proximal end is rotatably fitted to and supported by the first lever supporting pin 28, and a swinging-motion restricting hole 32a, through which the second lever supporting pin 30 is passed and which restricts the range of its swinging motion about the first lever supporting pin 28, is penetratingly formed in its distal end side. Further, an outer periphery of the distal end side abuts against one end of the primary shoe 3.

As shown in FIG. 3, the swinging-motion restricting hole 32a is an elongated hole which is elongated in the circumferential direction of the drum so as to allow the balance lever 32 to rotate about the first lever supporting pin 28.

As shown in FIG. 3, the input lever 34 includes an input transmitting portion 34a abutting against an intermediate portion of the balance lever 32; an input receiving portion 34b for receiving a shoe operating force from the operating-force generating mechanism 6; and a shoe abutting portion 34c for abutting against one end of the secondary shoe 4, the input lever 34 being adapted to transmit the shoe operating force inputted thereto from the operating-force generating mechanism 6 to the balance lever 32 and the secondary shoe 4.

The input transmitting portion 34a with a smooth curved surface is fitted to the intermediate portion of the balance lever 32 in a projection-recess fitting arrangement so as to be able to transmit the operating force smoothly to the balance lever 32 when the input lever 34 is swung.

The input receiving portion 34b is a recessed portion with which an end portion of the operating-force generating mechanism 6 is engaged. Further, the shoe abutting portion 34c is formed as a smooth projecting curved surface so as to be able to transmit the operating force smoothly to the secondary shoe 4 when the input lever 34 is swung.

As for the above-described shoe driving mechanism 7, in a state in which the balance lever 32 and the input lever 34 are placed between the base plates 25 and 26, the anchor pin 12 for the secondary shoe and the first and second lever supporting pins 28 and 30 are assembled to the base plates 25 and 26, and the respective pins are prevented from coming off by the stop rings 36 to form an assembly. Subsequently, the base plates 25 and 26 are fitted to the anchor pin 11 for the primary shoe, thereby assembling the shoe driving mechanism 7 to the backing plate 9 of the drum brake.

In the above-described shoe driving mechanism 7, during non-braking, the balance lever 32 is swingable toward the primary shoe 3 side with the first lever supporting pin 28 serving as a fulcrum in a state in which a gap is provided on the input lever 34 side in terms of the positional relationship between the swinging-motion restricting hole 32a and the second lever supporting pin 30, as shown in FIG. 3.

Then, when the shoe operating force is inputted from the operating-force generating mechanism 6 to the input lever 34 of the shoe driving mechanism 7, in order to start the swinging motion with the shoe abutting portion 34c or the input transmitting portion 34a as a fulcrum of rotation, the input lever 34 presses the intermediate portion of the balance lever 32 by the input transmitting portion 34a, and presses the secondary shoe 4 toward the inner peripheral surface of the drum by the shoe abutting portion 34c.

The pressing force applied from the input lever 34 to the intermediate portion of the balance lever 32 due to the swinging behavior of the input lever 34 causes the balance lever 32 to swing toward the primary shoe 3 side with the first lever supporting pin 28 as the fulcrum of rotation, thereby pressing the primary shoe 3 toward the inner peripheral surface of the drum.

Then, the swinging motion of the balance lever 32 toward the primary shoe 3 side with the first lever supporting pin 28 as the fulcrum of rotation terminates as the second lever supporting pin 30 is brought into contact with one end of the swinging-motion restricting hole 32a (there is no longer initial gap). Subsequently, the balance lever 32 and the base plates 25 and 26 swing as a unit about the anchor pin 11 for the primary shoe, thereby pressing the primary shoe 3 against the inner peripheral surface of the drum.

The pressing force applied from the input lever 34 to the secondary shoe 4 due to the swinging behavior of the input lever 34 displaces the secondary shoe 4 toward the inner peripheral surface side of the drum, thereby pressing the secondary shoe 4 against the inner peripheral surface of the drum.

As described above, a braking force is generated as the shoe operating force is inputted from the operating-force generating mechanism 6 to the input lever 34 of the shoe driving mechanism 7, and the swinging motion of the input lever 34 presses the respective brake shoes 3 and 4 against the inner peripheral surface of the drum.

In a state in which the braking force is being generated, the anchor reaction force of the secondary shoe 3 is applied to the anchor pin 12 for the secondary shoe disposed uprightly on the base plates 25 and 26, and the anchor reaction force applied to the anchor pin 12 causes torque M2 to be applied to the base plates 25 and 26 in a direction opposite to that of torque M1 applied to the base plates 25 and 26 by the shoe operating force.

Therefore, when the anchor reaction force reaches a predetermined magnification with respect to the shoe operating force, the torque M1 applied to the base plates 25 and 26 by the shoe operating force assumes a state of equilibrium with the torque M2 applied to the base plates 25 and 26 by the anchor reaction force.

Then, when the anchor reaction force exceeds the predetermined magnification with respect to the shoe operating force, the torque M2 applied to the base plates 25 and 26 by the anchor reaction force overcomes the torque M1 applied to the base plates 25 and 26 by the shoe operating force. Consequently, the base plates 25 and 26 rotate counterclockwise with the anchor pin 11 for the primary shoe as the fulcrum of rotation, and swing toward the secondary shoe 4 side.

This swinging motion of the base plates 25 and 26 toward the secondary shoe 4 side pushes back the input lever 34 through the balance lever 32 being retained by the first and second lever supporting pins 28 and 30, and applies to the input lever 34 a braking limiting force in a direction of decreasing the action of the shoe operating force. Therefore, it is possible to ensure both high performance of the braking force and stability by controlling the pressing force of the brake shoes 3 and 4 against the drum in correspondence with the anchor reaction force.

In addition, the position of balance between the shoe operating force and the anchor reaction force can be freely set and changed to a desired value by appropriately changing a distance L1 between the anchor pins 11 and 12, a distance L2 between the anchor pin 11 and the first lever supporting pin 28; a distance L3 from an input applying position on the balance lever 32 (the position of abutment of the input transmitting portion 34a) to the fulcrum of rotation, a distance L4 between the input transmitting portion 34a on the input lever 34 and the shoe abutting portion 34c, and the like, so that control of the anchor reaction force can be facilitated.

Moreover, since the shoe driving mechanism 7 of the present invention is disposed between the operating-force generating mechanism 6 and the brake shoes 3 and 4 and mechanically effects control of the braking force, not only the conventional actuator of the fluid pressure type such as a hydraulic wheel cylinder but also an actuator of an electrically powered type using such as an electric motor, as well as a manual-type operating-force generating mechanism 6 used in a parking brake or the like, can be suitably used as the operating-force generating mechanism 6, and is therefore highly versatile. Hence, the shoe driving mechanism 7 of the present invention is suitable for the adoption of the electrically powered system for coping with intelligent brake functions, hybrid vehicles, and the like.

Further, the shoe driving mechanism 7 is comprised of the base plates 25 and 26, the anchor pin 12 for the secondary shoe 4, the first and second lever supporting pins 28 and 30, the balance lever 32, and the input lever 34, so that a relatively fewer number of component parts are used. At the same time, since the arrangement provided is such that after the component parts are assembled in advance as a unit as shown in FIG. 4, the unit is assembled between the pair of brake shoes, it is possible to improve the operating efficiency in assembly as compared with the conventional arrangement in which the component members are consecutively assembled between the pair of brake shoes one by one.

Accordingly, if applied to the drum brake of the duo-servo type or the like, the shoe driving mechanism 7 of the present invention makes it possible to ensure high braking performance and stability, facilitates the adoption of an electrically powered system due to its excellent versatility, and makes it possible to reduce the manufacturing cost of the brake apparatus through improvement of the operating efficiency in assembly.

Figure 5:
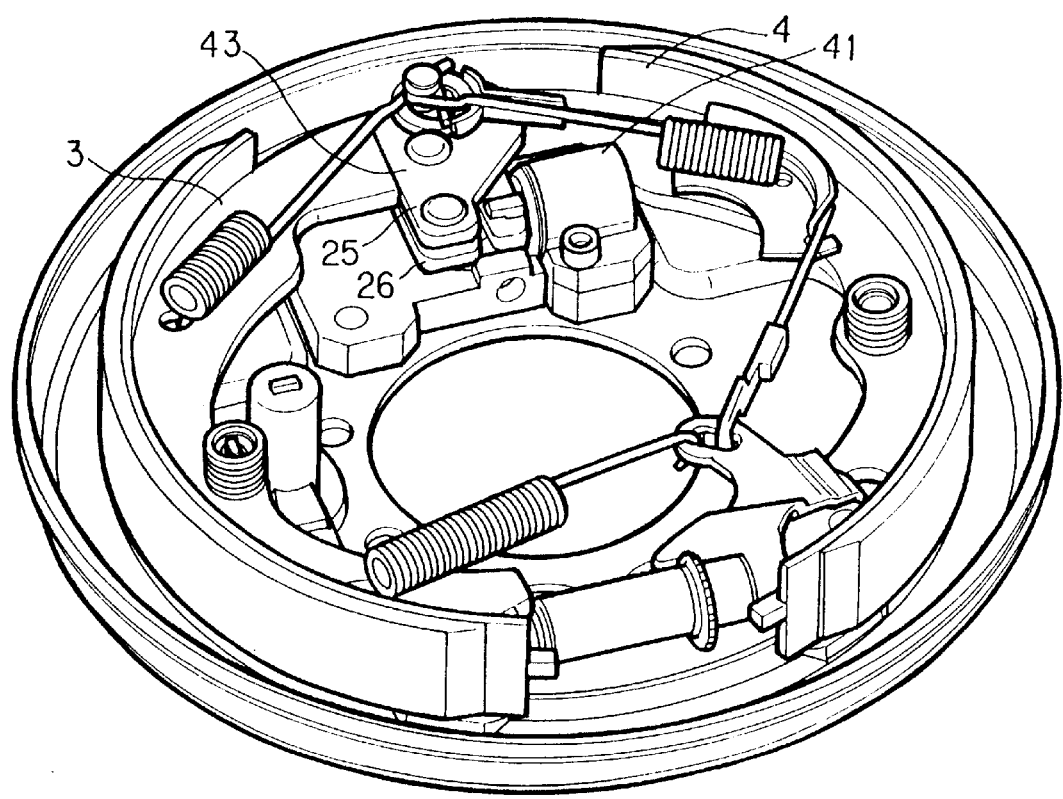
FIG. 5 is a perspective view of a second embodiment of the drum brake using the shoe driving mechanism in accordance with the present invention.
Figure 6:
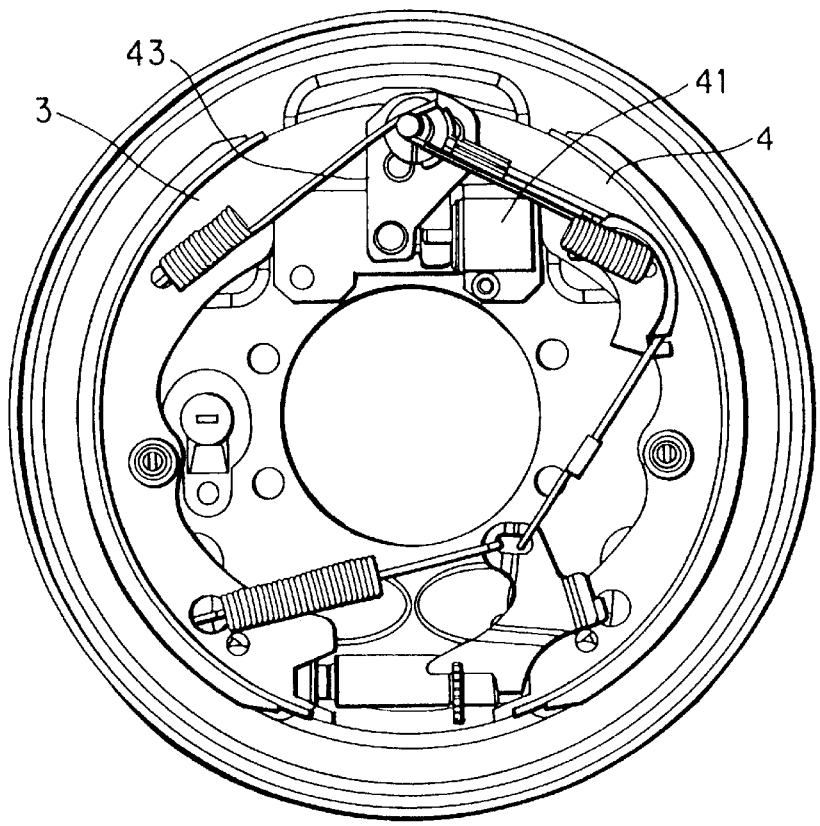
FIG. 6 is a front elevational view of the drum brake shown in FIG. 5.
Figure 7:
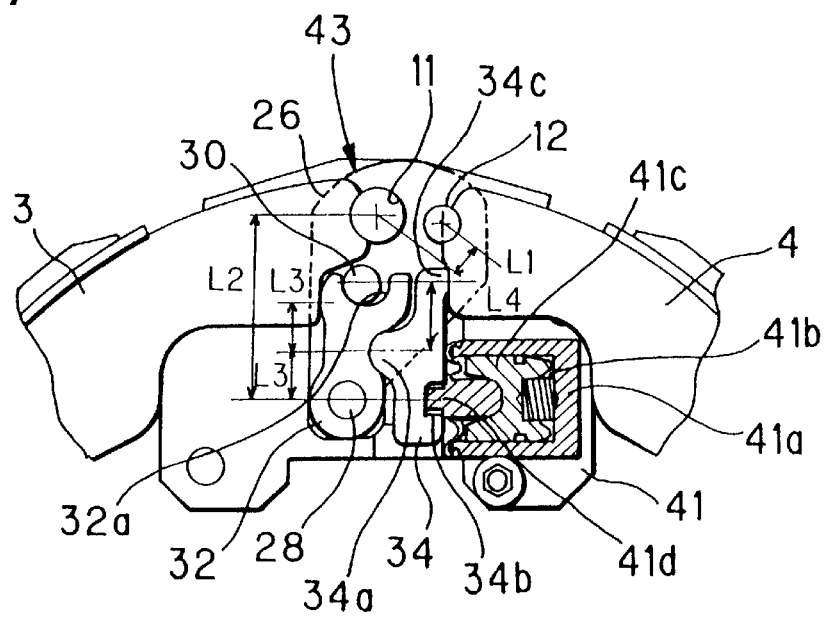
FIG. 7 is an enlarged view, with the upper base plate removed, of the shoe driving mechanism shown in FIG. 6.

FIGS. 5 to 7 illustrate a second embodiment of the shoe driving mechanism for a drum brake in accordance with the present invention, in which FIG. 5 is a perspective view of the drum brake using the shoe driving mechanism in accordance with the present invention, FIG. 6 is a front elevational view of the drum brake, and FIG. 7 is an enlarged view, with the upper base plate removed, of the shoe driving mechanism.

In the drum brake of this second embodiment, a fluid-pressure type actuator 41 is used as the operating-force generating mechanism for generating the shoe operating force, and improvements are correspondingly made on a shoe driving mechanism 43 for transmitting outputs of the fluid-pressure type actuator 41 to the brake shoes 3 and 4. The arrangements excluding the above points are common to those shown in the first embodiment. Common arrangements are denoted by the same reference numerals, and a description thereof will be omitted.

When a fluid pressure is supplied to a fluid chamber 41b inside a cylinder 41a in correspondence with a braking operation, the fluid-pressure type actuator 41 outputs a shoe operating force from its piston 41c, which is displaced by that fluid pressure, to the input lever 34 of the shoe driving mechanism 43 through a rod 41d.

As for the shoe driving mechanism 43 of this embodiment, the input receiving portion 34b of the input lever 34 is formed as a notch with which an end portion of the rod 41d of the fluid-pressure type actuator 41 engaged. In addition, in the shoe driving mechanism 43 of this embodiment, the balance lever 32 for transmitting to the primary shoe 3 the shoe operating force inputted from the input transmitting portion 34a of the input lever 34 is supported by the first and second lever supporting pins 28 and 30 disposed uprightly on the base plates 25 and 26 in the same way as the first embodiment. However, the swinging-motion restricting hole 32a for engagement with the second lever supporting pin 30 is formed as a notch to facilitate the assembly of the balance lever 32.

The arrangement of the shoe driving mechanism 43, excluding the shape of the input transmitting portion 34a and the shape of the swinging-motion restricting hole 32a described above, is common to that of the shoe driving mechanism 7 shown in the first embodiment. The common points are denoted by the same reference numerals, and a description thereof will be omitted.

It should be noted that, in the case of this embodiment, the gap dimensions L1, L2, L3, L4, and the like concerning the anchor pins 11 and 12 which are set for controlling the anchor reaction force are similar to those of the first embodiment.

Thus, in the arrangement in which the fluid-pressure type actuator 41 is used as the operating-force generating mechanism, the construction of the shoe driving mechanism 43 basically requires no change, and it is possible to obtain effects and advantages similar to those of the first embodiment.

Figure 8:
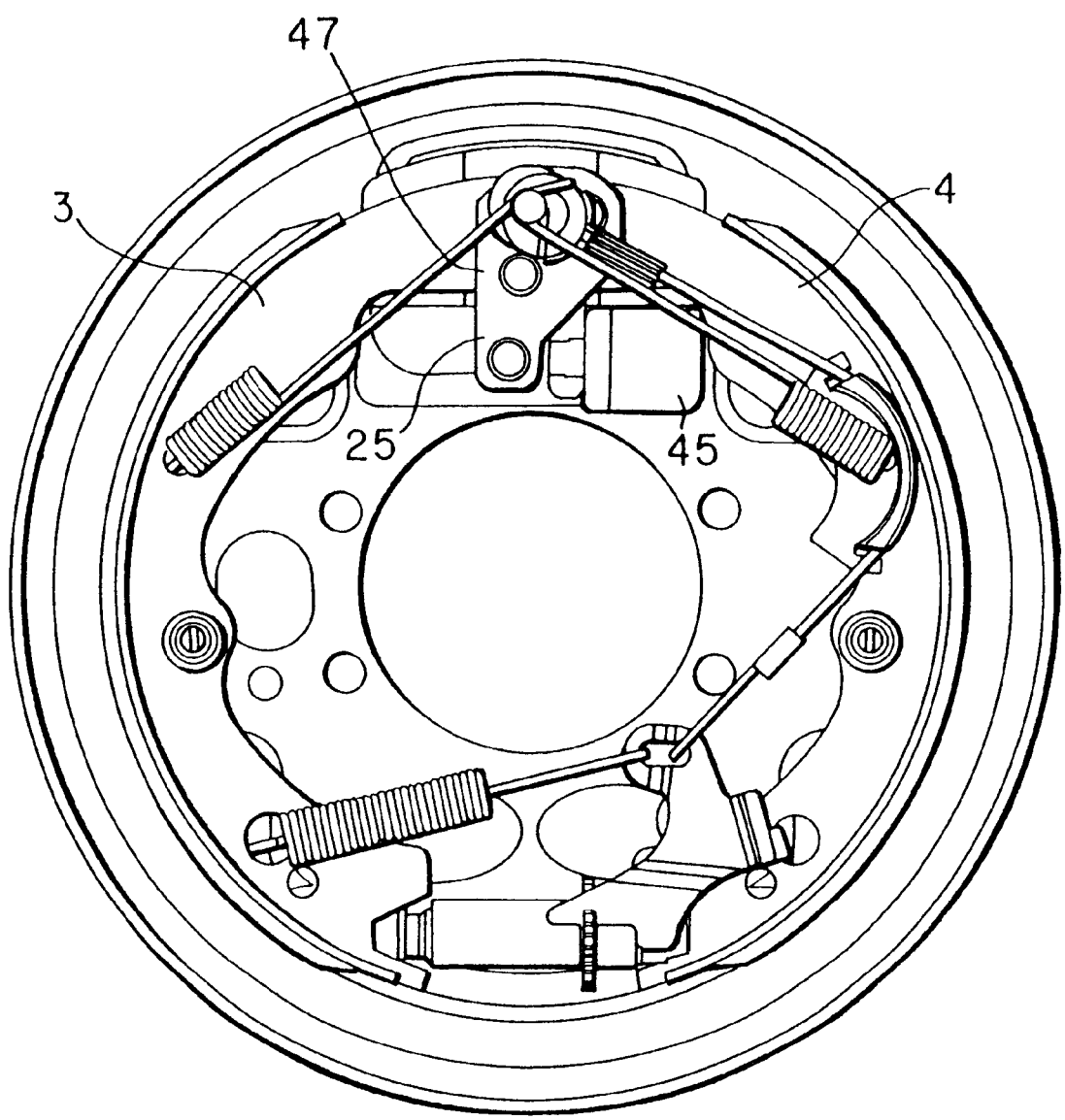
FIG. 8 is a perspective view of a third embodiment of the drum brake using the shoe driving mechanism in accordance with the present invention.
Figure 9:
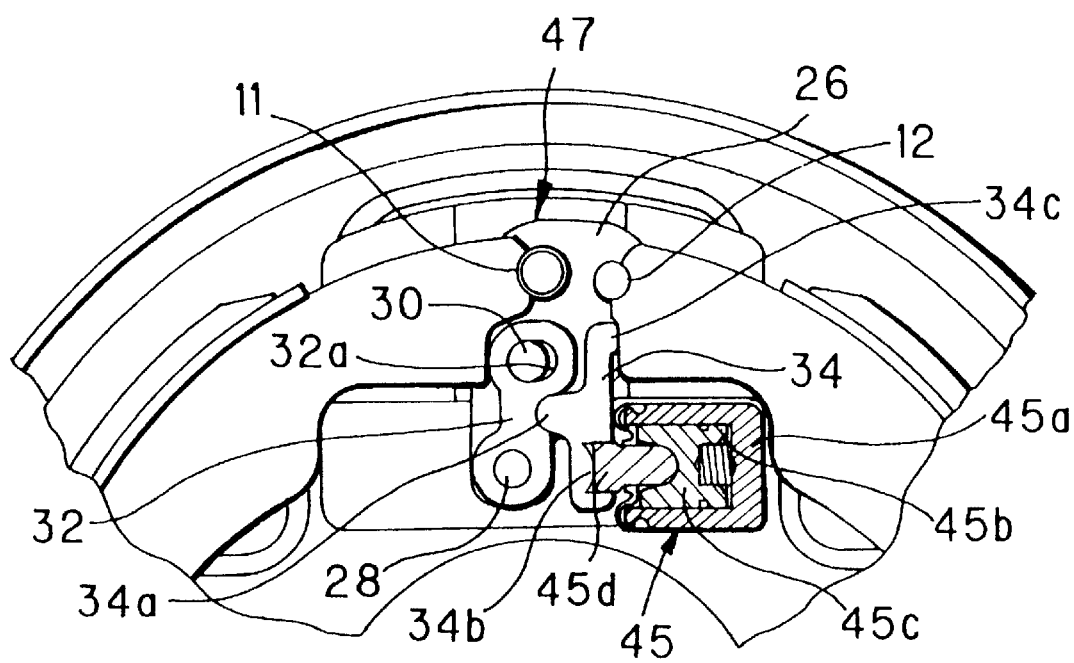
FIG. 9 is an enlarged view, with the upper base plate removed, of the shoe driving mechanism shown in FIG. 8.

FIGS. 8 and 9 illustrate a third embodiment of the shoe driving mechanism for a drum brake in accordance with the present invention, in which FIG. 8 is a front elevational view of the drum brake using the shoe driving mechanism in accordance with the present invention, and FIG. 9 is an enlarged view, with the upper base plate removed, of the shoe driving mechanism.

In the drum brake of this third embodiment, a fluid-pressure type actuator 45 is used as the operating-force generating mechanism for generating the shoe operating force in the same way as the case of the second embodiment.

When a fluid pressure is supplied to a fluid chamber 45b inside a cylinder 45a in correspondence with a braking operation, the fluid-pressure type actuator 45 outputs a shoe operating force from its piston 45c, which is displaced by that fluid pressure, to the input lever 34 of a shoe driving mechanism 47 through a rod 45d. If comparison is made with the fluid-pressure type actuator 41 of the second embodiment, an improvement is made on the shape of the end portion of the rod 45d.

As compared to the case of the second embodiment, the shape of the end portion of the rod 45d is set to a large-sized flat surface.

Then, in the case of this third embodiment, as compared with the input lever 34 of the second embodiment, the input lever 34 of the shoe driving mechanism 47 with which the rod 45d is brought into contact has a structure in which a convex curved surface which smoothly comes into contact with the end portion of the rod 45d is formed on the input receiving portion 34b.

Except for the fact that the convex curved surface is formed on the input receiving portion 34b to improve the contactability with the rod 45d, the shoe driving mechanism 47 of this third embodiment has a substantially identical construction to that of the shoe driving mechanism 7 in the first embodiment.

In the arrangement of this third embodiment as well, it is possible to obtain effects and advantages similar to those of the first and second embodiments.

It should be noted that although, in the foregoing embodiments, the shoe driving mechanism is so arranged that the balance lever 32 and the input lever 34 are accommodated between the pair of upper and lower base plates 25 and 26, either one of the base plates may be used if it is possible to obtain necessary mechanical strength such as the joining strength between the first and second lever supporting pins 28 and 30 and the base plate 25.

In addition, as the operating-force generating mechanism 6, it is possible to use the mechanical lever member shown in the first embodiment or the fluid-pressure type actuator shown in the second and third embodiments, and it is also possible to use a actuator of an electrically powered type using an electric motor or the like.

In accordance with the shoe driving mechanism for the drum brake, when the shoe operating force is inputted from the operating-force generating mechanism to the input lever of the shoe driving mechanism, in order to start the swinging motion with the shoe abutting portion or the input transmitting portion as a fulcrum of rotation, the input lever presses the intermediate portion of the balance lever by the input transmitting portion, and presses the secondary shoe toward the inner peripheral surface of the drum by the shoe abutting portion. Then, the swinging motion of the input lever due to the shoe operating force causes the brake shoes to be pressed against the inner peripheral surface of the drum, thereby generating a braking force.

Then, in the state in which the braking force is being generated, the anchor reaction force of the secondary shoe is applied to the anchor pin for the secondary shoe disposed uprightly on the base plates, and the anchor reaction force applied to the anchor pin for the secondary shoe causes torque to be applied to the base plates in a direction opposite to that of torque applied to the base plates by the shoe operating force. Therefore, when the anchor reaction force reaches a predetermined magnification with respect to the shoe operating force, the torque applied to the base plates by the shoe operating force assumes a state of equilibrium with the torque applied to the base plates by the anchor reaction force. Then, when the anchor reaction force exceeds the predetermined magnification with respect to the shoe operating force, the torque applied to the base plates by the anchor reaction force overcomes the torque applied to the base plates by the shoe operating force. Consequently, the base plates swing toward the secondary shoe side with the anchor pin for the primary shoe as the fulcrum of rotation. This swinging motion of the base plates toward the secondary shoe side pushes back the input lever through the balance lever being retained by the first and second lever supporting pins, and applies to the input lever a braking limiting force in a direction of decreasing the action of the shoe operating force. Therefore, it is possible to ensure both high performance of the braking force and stability by controlling the pressing force of the brake shoes against the drum in correspondence with the anchor reaction force.

Moreover, since the shoe driving mechanism of the present invention is disposed between the operating-force generating mechanism and the brake shoes and mechanically effects control of the braking force, not only the conventional actuator of the fluid pressure type such as a hydraulic wheel cylinder but also an actuator of an electrically powered type using such as an electric motor, as well as a manual-type operating-force generating mechanism used in a parking brake or the like, can be suitably used as the operating-force generating mechanism, and is therefore highly versatile. Hence, the shoe driving mechanism of the present invention is suitable for the adoption of the electrically powered system for coping with intelligent brake functions, hybrid vehicles, and the like.

Further, the shoe driving mechanism is comprised of the base plates, the anchor pin for the secondary shoe, the first and second lever supporting pins, the balance lever, and the input lever, so that a relatively fewer number of component parts are used. At the same time, since the arrangement provided is such that after the component parts are assembled in advance as a unit, the unit is assembled between the pair of brake shoes, it is possible to improve the operating efficiency in assembly as compared with the conventional arrangement in which the component members are consecutively assembled between the pair of brake shoes one by one.

Accordingly, if applied to the drum brake of the duo-servo type or the like, the shoe driving mechanism 7 of the present invention makes it possible to ensure high braking performance and stability, facilitates the adoption of an electrically powered system due to its excellent versatility, and makes it possible to reduce the manufacturing cost of the brake apparatus through improvement of the operating efficiency in assembly.

What is claimed is:

1. A shoe driving mechanism for a drum brake wherein a shoe operating force generated by an operating-force generating mechanism is transmitted to a primary shoe and a secondary shoe arranged in face-to-face relation in an inner space of a drum to press the primary shoe and the secondary shoe against the drum, and a pressing force of the primary shoe and the secondary shoe against the drum is controlled in correspondence with an anchor reaction force applied to anchor pins for the primary shoe and the secondary shoe, said shoe driving mechanism comprising:

a first base plate which is rotatably fitted to the anchor pin for the primary shoe, said first base plate including an inserting portion of the anchor pin for the primary shoe;

the anchor pin for the secondary shoe disposed uprightly at a position spaced apart a predetermined distance in the circumferential direction of the drum from the inserting portion of said first base plate;

a first lever supporting pin disposed uprightly at a position spaced apart on a radially inward side of the drum from the inserting portion of said first base plate;

a second lever supporting pin disposed uprightly at an intermediate position between said first lever supporting pin and the inserting portion of said first base plate;

a balance lever rotatably fitted to and supported by said first lever supporting pin in a proximal end portion of said balance lever, said balance lever including a swinging-motion restricting hole penetratingly formed in a distal end portion of said balance lever, wherein said second lever supporting pin is passed through the swinging-motion restricting hole, and the swinging-motion restricting hole restricts a range of a swinging motion of said balance lever about the first lever supporting pin, and an outer periphery of the distal end portion abuts against one end of the primary shoe; and an input lever brought into contact with said balance lever and the secondary shoe and adapted to transmit the shoe operating force inputted from the operating-force generating mechanism to said balance lever and the secondary shoe, wherein the pressing force applied to the primary shoe and the secondary shoe is restricted by the behavior of said first base plate, said balance lever, and said input lever corresponding to the anchor reaction force applied through said anchor pin for the secondary shoe and said input lever during braking.

2. The shoe driving mechanism according to claim 1, wherein said anchor pin for the secondary shoe, said first lever supporting pin, said second lever supporting pin, said balance lever, and said input lever are assembled to said first base plate.

3. The shoe driving mechanism according to claim 1, wherein after said anchor pin for the secondary shoe, said first lever supporting pin, said second lever supporting pin, said balance lever, and said input lever are assembled to said first base plate as an assembly, said first base plate is fitted to the anchor pin for the primary shoe so as to assemble the shoe driving mechanism to a backing plate of the drum brake.

4. The shoe driving mechanism according to claim 1, further comprising a second base plate, wherein said balance lever and said input lever are sandwiched between said first base plate and said second base plate.

5. The shoe driving mechanism according to claim 1, wherein the swinging-motion restricting hole of said balance lever is an elongated hole elongated in the circumferential direction of the drum.

6. The shoe driving mechanism according to claim 1, wherein the swinging-motion restricting hole of said balance lever is formed as a notch.

7. The shoe driving mechanism according to claim 1, wherein said input lever includes a input receiving portion receiving the shoe operating force generated by the operating-force generating mechanism, and the input receiving portion includes a convex curved surface.

* * * * *